(12) United States Patent
Bassett

(10) Patent No.: US 7,128,356 B2
(45) Date of Patent: Oct. 31, 2006

(54) CARGO BOX ASSEMBLY AND METHOD OF USE THEREOF

(76) Inventor: Brenda J. Bassett, 1244 Hopewell Rd., Lizella, GA (US) 31052

( * ) Notice: Subject to any disclaimer, the term of this patent is extended or adjusted under 35 U.S.C. 154(b) by 0 days.

(21) Appl. No.: 11/069,006

(22) Filed: Mar. 1, 2005

(65) Prior Publication Data

US 2006/0197352 A1   Sep. 7, 2006

(51) Int. Cl.
*B60R 11/06* (2006.01)
*B60R 9/06* (2006.01)

(52) U.S. Cl. ................................... 296/37.6

(58) Field of Classification Search ............. 296/37.6, 296/24.3, 24.34, 24.32, 24.35, 24.4, 24.41
See application file for complete search history.

(56) References Cited

U.S. PATENT DOCUMENTS

| | | | |
|---|---|---|---|
| 2,329,419 A | | 9/1943 | Reed |
| 2,867,471 A | | 1/1959 | Coon, Jr. |
| 3,231,305 A | * | 1/1966 | Beckman ............... 296/100.12 |
| 3,823,992 A | | 7/1974 | Corbett |
| 4,089,554 A | | 5/1978 | Myers |
| 4,289,346 A | * | 9/1981 | Bourgeois ................... 296/105 |
| 4,518,189 A | | 5/1985 | Belt |
| 4,522,326 A | * | 6/1985 | Tuohy, III .................. 224/310 |
| 4,543,798 A | | 10/1985 | Page |
| 4,603,901 A | * | 8/1986 | McIntosh et al. ........... 296/165 |
| 4,635,992 A | | 1/1987 | Hamilton et al. |
| 4,672,944 A | | 6/1987 | Curry |
| 4,756,325 A | * | 7/1988 | Daniels .................... 135/88.09 |
| 4,842,316 A | | 6/1989 | Lerma et al. |
| 4,969,678 A | | 11/1990 | Loisel |
| 5,037,153 A | | 8/1991 | Stark |
| 5,052,878 A | * | 10/1991 | Brockhaus .................. 414/522 |
| 5,088,636 A | | 2/1992 | Barajas |
| 5,121,959 A | * | 6/1992 | King ......................... 296/37.6 |
| 5,263,467 A | | 11/1993 | Jones |
| 5,301,992 A | * | 4/1994 | Whitmore ................... 296/37.1 |
| 5,311,790 A | * | 5/1994 | Yanagisawa ............. 74/490.09 |
| 5,387,064 A | * | 2/1995 | Cardinal ...................... 410/89 |
| 5,391,042 A | * | 2/1995 | Song ........................ 296/26.09 |
| 5,398,987 A | | 3/1995 | Sturgis |
| 5,538,386 A | | 7/1996 | Scheibel |
| 5,564,767 A | * | 10/1996 | Strepek .................... 296/26.09 |
| 5,586,546 A | | 12/1996 | Ashcraft et al. |
| 5,622,299 A | | 4/1997 | Berard |
| 5,685,592 A | * | 11/1997 | Heinz ....................... 296/37.16 |
| 5,804,932 A | * | 9/1998 | Yanagisawa ................... 318/6 |
| 5,848,744 A | | 12/1998 | Dischner et al. |
| 5,862,540 A | | 1/1999 | Chuan |
| 5,924,616 A | | 7/1999 | Shives |
| 5,934,726 A | | 8/1999 | Bossett |
| 6,006,971 A | | 12/1999 | Coleman et al. |
| 6,007,128 A | | 12/1999 | Hines, Jr. |
| 6,015,177 A | | 1/2000 | Tijerina |

(Continued)

*Primary Examiner*—Hilary Gutman
(74) *Attorney, Agent, or Firm*—Williamson Intellectual Property Law, LLC; Thomas R. Williamson, III

(57) ABSTRACT

A cargo box assembly and method of use thereof, wherein a cargo box is mounted within the bed of a pickup truck, and wherein the cargo box may be moved between a stored position at the forward end of the truck bed and a tailgate position at the rear end of the truck bed. The cargo box is mounted to a pair of rail assemblies, wherein each rail assembly comprises a chain and a pair of gears to facilitate motorized movement of the box within the truck bed.

22 Claims, 4 Drawing Sheets

U.S. PATENT DOCUMENTS

| | | |
|---|---|---|
| 6,116,673 A | 9/2000 | Clonan |
| 6,203,086 B1 | 3/2001 | Dirks et al. |
| 6,253,976 B1 | 7/2001 | Coleman et al. |
| 6,254,160 B1 | 7/2001 | Marriott et al. |
| 6,264,083 B1 | 7/2001 | Pavlick et al. |
| 6,270,137 B1 | 8/2001 | Minix et al. |
| 6,318,780 B1 | 11/2001 | St. Aubin |
| 6,354,647 B1 | 3/2002 | Voves |
| 6,375,054 B1 | 4/2002 | Lance et al. |
| 6,409,064 B1 * | 6/2002 | Bayley ................ 224/404 |
| D460,656 S | 7/2002 | Caulder |
| 6,431,634 B1 * | 8/2002 | Ananian ............. 296/100.12 |
| 6,460,744 B1 | 10/2002 | Lance et al. |
| 6,464,277 B1 * | 10/2002 | Wilding ................ 296/37.6 |
| 6,568,732 B1 * | 5/2003 | De Gaillard ........... 296/24.43 |
| 6,575,155 B1 | 6/2003 | Brennan |
| 6,607,230 B1 | 8/2003 | Voves |
| 6,626,479 B1 * | 9/2003 | Skoug ................ 296/37.6 |
| 6,629,714 B1 | 10/2003 | Campbell |
| 6,672,641 B1 | 1/2004 | Hodge |
| 6,698,634 B1 | 3/2004 | Thomson |
| 6,725,855 B1 | 4/2004 | Brennan |
| 6,749,243 B1 * | 6/2004 | Voves ................ 296/37.6 |
| 6,814,383 B1 | 11/2004 | Reed, III et al. |
| 6,893,072 B1 * | 5/2005 | Graves ............... 296/100.12 |
| 6,945,580 B1 * | 9/2005 | Hentes ............... 296/37.6 |
| 6,948,760 B1 * | 9/2005 | Marx et al. .......... 296/100.12 |
| 2002/0014505 A1 | 2/2002 | Lance et al. |
| 2004/0080248 A1 | 4/2004 | Klusmeier |

* cited by examiner

CARGO BOX ASSEMBLY AND METHOD OF USE THEREOF

TECHNICAL FIELD

The present invention relates generally to vehicular storage containers, and more specifically to a cargo box assembly and method of use thereof, wherein a motorized assembly enables the cargo box to effortlessly move through the length of a truck bed or similar vehicular cargo support structure.

BACKGROUND OF THE INVENTION

Vehicle-mounted cargo containers are often mounted within the cargo beds of pickup trucks to facilitate the stowage of luggage, blankets, tools and other selected articles. Indeed, due to the relatively limited amount of covered and/or enclosed space offered by most pickup trucks, such cargo containers are typically necessary to safely transport items without the risk of loss or theft, or damage due to environmental exposure.

However, despite the relative effectiveness of such vehicle-mounted containers, many such devices generally suffer from a common design flaw. More specifically, to permit rear access to the truck bed, cargo containers are typically mounted toward the forward end of the truck bed (i.e., closest to the truck cab), so as to not obstruct or otherwise inhibit rear access to the cargo area via the tailgate. Consequently, individuals wishing to access the cargo container are forced to either reach up and over the sidewalls of the truck bed or climb into the truck bed via the tailgate. This problem is further exacerbated due to the high ground clearance that is commonly associated with most trucks and off-road vehicles.

Accordingly, available wheeled truck boxes enable slidable movement of the cargo box between a stored position toward the forward end of the truck bed, and a tailgate position toward the rear end of the truck bed. Such conventional sliding truck box assemblies typically comprise a storage container having a plurality of wheels that are slidably engaged and supported between a set of tracks, wherein the tracks are installed on opposing inner sidewalls of the truck bed.

Unfortunately, however, despite the ability of wheeled truck boxes to alternate between stored and tailgate positions, wheeled truck boxes also suffer from several structural defects. For instance, wheeled truck boxes disadvantageously have a tendency to unexpectedly roll or shift, such as, for example, when the vehicle is positioned on an incline and/or when the vehicle is accelerated or decelerated abruptly. In addition to the danger imposed on the driver and passengers, uncontrolled rolling or movement of large storage receptacles may lead to damage or destruction of the truck, the cargo and/or surrounding vehicles. As such, locking mechanisms are often required to restrain movement or otherwise secure the truck box in place. Inconveniently, however, such locking mechanisms must be unlocked prior to movement of the truck box and locked prior to transit of the vehicle.

Moreover, without the assistance of external forces, such as gravity or inertia, it may be difficult to slide truck boxes carrying heavy cargo loads. Thus, the arduous task of manually sliding a large and heavy storage bin within a truck bed can impart significant physical strain on an individual, even with the assistance of wheels. Moreover, such a task may compel the individual to climb into the bed of the truck, thereby offsetting one of the intended purposes of the wheeled truck box.

Therefore, it is readily apparent that there is a need for an automated or motorized vehicular cargo box that can be effortlessly moved between stored and tailgate positions. Moreover, there is a need for such a vehicular cargo box that will not uncontrollably and unexpectedly roll or shift within the truck bed.

BRIEF SUMMARY OF THE INVENTION

Briefly described, in a preferred embodiment, the present invention overcomes the above-mentioned disadvantages and meets the recognized need for such an invention by providing a cargo box assembly and method of use thereof, wherein a cargo box is operatively mounted within the bed of a pickup truck, and movable between a stored position and a tailgate position via a motorized assembly.

According to its major aspects and broadly stated, the present invention in its preferred form comprises a container or cargo box, rail assemblies, and a motor assembly, wherein the rail assemblies preferably comprise gear-and-chain mechanisms or, alternatively, screwdrive mechanisms, which, in combination with the motor assembly, facilitates overall motorized or automated movement of the container through a truck bed.

More specifically, the motor assembly is coupled to the rail assemblies to impart a motorized force to the gear-and-chain mechanisms or, alternatively, the screwdrive mechanisms, of the rail assemblies. Further, the gear-and-chain or alternative screwdrive mechanisms comprise mounting supports upon which the cargo box is disposed, wherein movement of the chain/screwdrive meachanism via the motorized assembly urges the mounting supports through the rail assemblies and thus the cargo box through the truck bed. The rail assemblies are disposed on opposing sidewalls of the truck bed and, as such, activation of the motor assembly moves the cargo box between stored and tailgate positions within the truck bed.

Accordingly, a feature and advantage of the present invention is its incorporation of an automated or motorized cargo box assembly to enable easy and convenient access to the cargo box of a truck bed.

Another feature and advantage of the present invention is its ability to prevent the box from sliding when the truck is situated on an incline and/or when the truck accelerates or abruptly brakes.

Still another feature and advantage of the present invention is that it eliminates the need for a securing mechanism to lock and unlock the cargo box in a fixed position.

Yet another feature and advantage of the present invention is its ability to move a cargo box utilizing a gear-and-chain mechanism.

Still yet another feature and advantage of the present invention is its ability to move a cargo box utilizing a screwdrive mechanism.

These and other features and advantages of the present invention will become more apparent to one skilled in the art from the following description and claims when read in light of the accompanying drawings.

BRIEF DESCRIPTION OF THE DRAWINGS

The present invention will be better understood by reading the detailed description of the preferred and selected alternative embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternative embodiments of the present invention, as illustrated in FIGS. 1–5, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
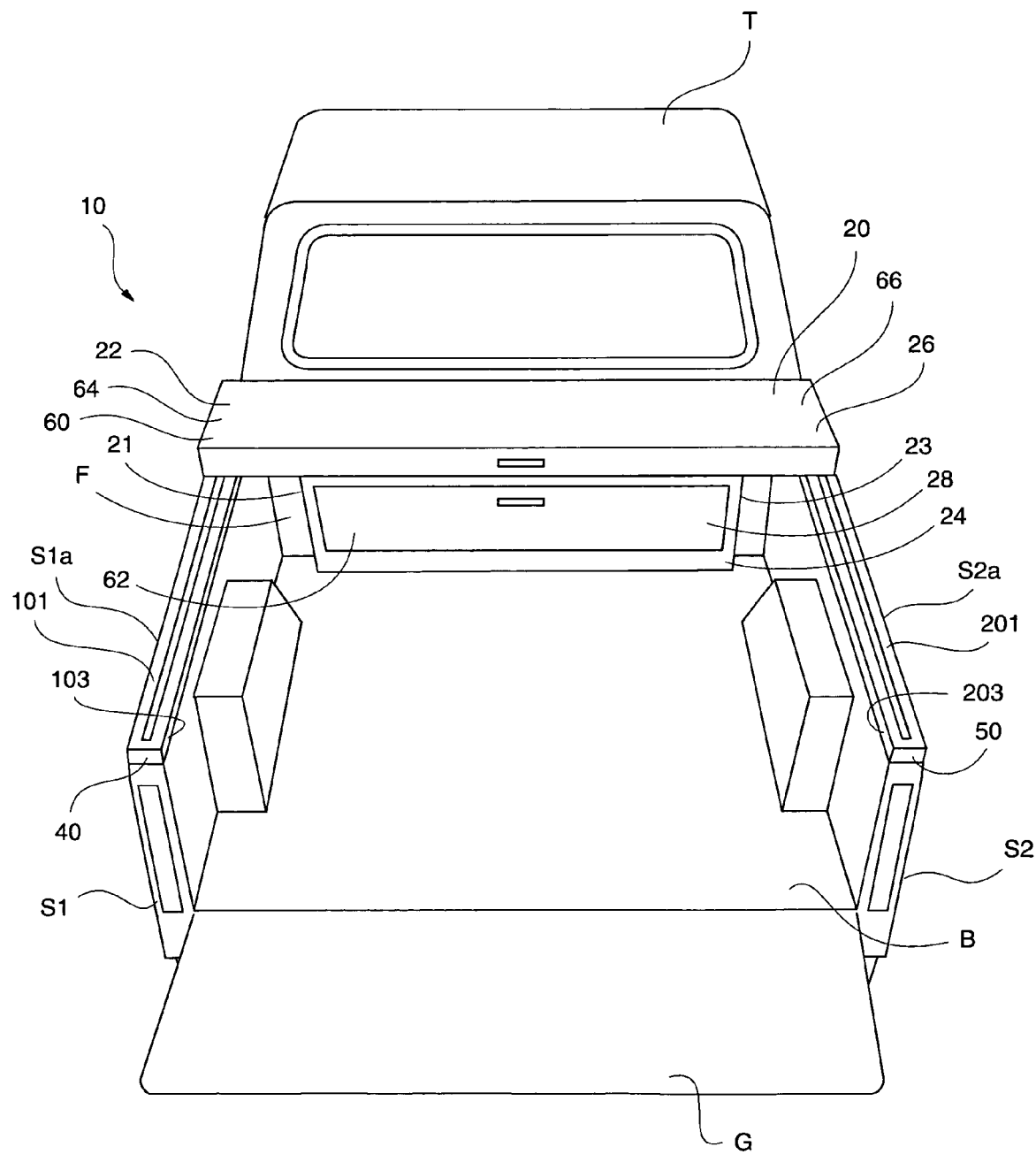
FIG. 1 is a perspective view of a cargo box assembly according to a preferred embodiment of the present invention.
Figure 2:
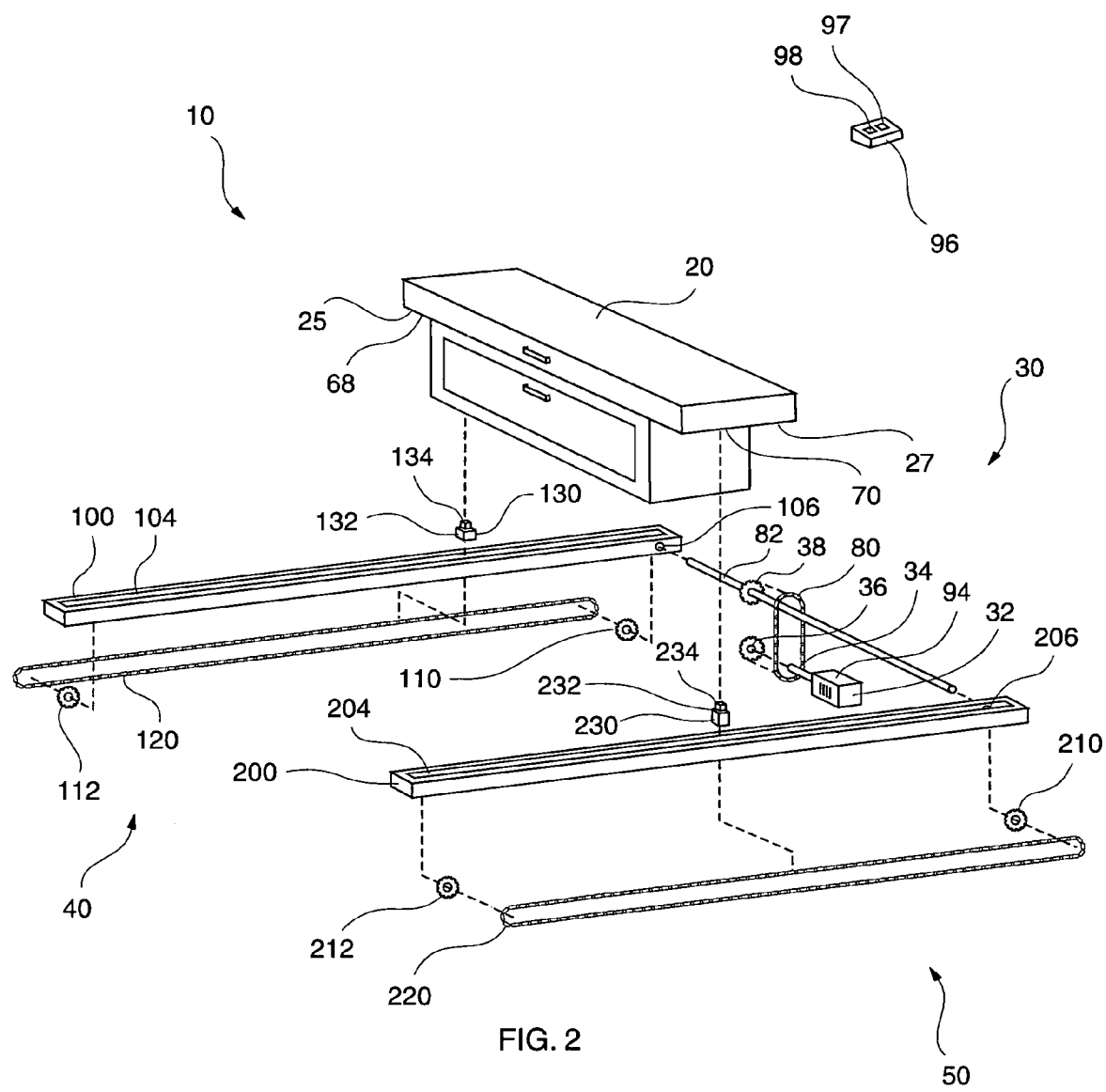
FIG. 2 is an exploded view of a cargo box assembly according to a preferred embodiment of the present invention.

Referring now to FIGS. 1–2, the present invention in a preferred embodiment is cargo box assembly 10 comprising cargo box 20, motor assembly 30 and rail assemblies 40, 50. Preferably, cargo box assembly 10 is operatively mounted within bed B of pickup truck T, wherein bed B comprises first sidewall S1, second sidewall S2, front wall F and tailgate G. It is important to understand that the present invention may be utilized within various types of vehicles and/or cargo support structures, such as, for exemplary purposes only, box trucks, vans, sports utility vehicles, station wagons, hatchback sedans, train cars, boats, and barges.

Cargo box 20 preferably comprises upper storage member 22 and lower storage member 24, wherein upper storage member 22 is preferably mounted to the top of lower storage member 24. Preferably, upper storage member 22 and lower storage member 24 comprise cavities 26, 28, respectively, for storing cargo and the like. Cavities 26, 28 of upper storage member 22 and lower storage member 24, respectively, are preferably separated via a horizontal dividing wall; although it is contemplated, in an alternative embodiment, that cargo box 20 may comprise any number of cavities. Upper storage member 22 and lower storage member 24 further preferably comprise doors 60, 62, respectively, for accessing cavities 26, 28, respectively, thereof.

Upper storage member 22 preferably comprises first side end 64 and second side end 66, wherein first side end 64 and second side end 66 preferably extend over sidewalls 21, 23 of lower storage member 24, respectively. Preferably, first side end 64 and second side end 66 of upper storage member 22 comprise apertures 68, 70, respectively, wherein apertures 68, 70 are disposed on undersides 25, 27, respectively, thereof. Apertures 68, 70 are preferably dimensioned to receive and retain securing pegs therewithin, as more fully described below.

Preferably, motor assembly 30 is mounted to front wall F of bed B, wherein motor assembly 30 comprises motor 32, axle 34, lower gear 36, upper gear 38, chain 80 and shaft 82. Preferably, motor 32 is a conventional electric motor, wherein axle 34 extends from motor 32, and wherein motor 32 creates a rotational force to rotate axle 34 in either a clockwise or counterclockwise direction. Motor 32 preferably comprises a battery source; although it is contemplated in an alternative embodiment that motor 32 could be linked to the battery of truck T.

Preferably, lower gear 36 is coupled to axle 34, wherein upper gear 38 is concentrically or axially disposed on shaft 82, transversely disposed above motor 32 and between rail assemblies 40, 50, as more fully described below. Preferably, lower gear 36 and upper gear 38 comprise toothed peripheral edges, wherein belt chain 80 is disposed around lower gear 36 and upper gear 38 cooperatively engaged with the toothed peripheral edges thereof. Accordingly, motorized rotation of lower gear 36 via motor 32 preferably drives belt chain 80, wherein belt chain 80 subsequently drives upper gear 38, and thus rotates shaft 82.

Preferably, motor assembly 30 further comprises receiving unit 94 and remote unit 96, wherein receiving unit 94 is adapted to receive signals transmitted from remote unit 96, and wherein such signals direct receiving unit 94 to activate motor 32. Preferably, remote unit 96 is a handheld remote control, wherein remote unit 96 comprises forward actuation button 97 and backward actuation button 98 for controlling the movement of cargo box 20.

Rail assemblies 40, 50 preferably function to operatively mount cargo box 20 within bed B, wherein rail assemblies 40, 50 are disposed on topsides S1a and S2a of first sidewall S1 and second sidewall S2, respectively, of bed B. Preferably, rail assemblies 40, 50 comprise housings 100, 200, respectively, front gears 110, 210, respectively, rear gears 112, 212, respectively, belt chains 120, 220, respectively, and securing blocks 130, 230, respectively.

Housings 100, 200 of respective rail assemblies 40, 50 preferably comprise slots 104, 204, respectively, and apertures 106, 206, respectively. Slots 104, 204 are preferably elongated rectangular apertures preferably centrally disposed on topsides 101, 201, respectively, of housings 100, 200, respectively. Preferably, apertures 106, 206 are disposed on inner sidewalls 103, 203, respectively, of housings 100, 200, respectively, wherein apertures 106, 206 are situated proximate front wall F of bed B. Apertures 106, 206 are preferably dimensioned to receive and retain shaft 82 of motor assembly 30 therewithin, as more fully described below.

Front gears 110, 210 and rear gears 112, 212 of respective rail assemblies 40, 50 are preferably disposed within housings 100, 200 and securely retained therewithin via stanchions (not shown). Preferably, front gears 110, 210 and rear gears 112, 212 are rotatably connected to the stanchions, wherein the stanchions are affixed to the interior sidewalls of housings 100, 200.

Front gears 110, 210 are preferably situated toward the front ends of rail assemblies 40, 50, respectively, proximate front wall F of bed B; and rear gears 112, 212 are preferably situated toward the rear ends of rail assemblies 40, 50, respectively, proximate tailgate G of bed B. Front gears 110, 210 are preferably coupled to shaft 82 of motor assembly 30, thus transversely supporting or suspending shaft 82 between rail assemblies 40, 50. Preferably, the rotational force applied to shaft 82 via motor 32 is transferred to front gears 110, 210.

Belt chain 120 of rail assembly 40 is preferably disposed around, and cooperatively engaged with, front gear 110 and rear gear 112 of rail assembly 40. Similarly, belt chain 220 of rail assembly 50 is preferably disposed around, and cooperatively engaged with front gear 210 and rear gear 212 of rail assembly 50. Accordingly, a rotational force that is applied to front gears 110, 210 of rail assemblies 40, 50, respectively, via motor-and-chain drive shaft 82, is transferred to belt chains 120, 220, respectively.

Securing blocks 130, 230 of rail assemblies 40, 50, respectively, preferably comprise base members 132, 232, respectively, and peg members 134, 234, respectively, extending therefrom. Base members 132, 232 are preferably securely coupled to belt chains 120, 220, respectively, wherein rotary motion of belt chains 120, 220 preferably draw securing blocks 130, 230, through respective slots 104, 204 of respective rail assemblies 40, 50. Preferably, base members 132, 232 of securing blocks 130, 230, respectively, are preferably welded to respective belt chains 120, 220; however, it is recognized that other suitable fastening means may be utilized, such as, for exemplary purposes only, adhesives, clamps, clasps, bolts, screws, pegs, pins, dowels, rivets, or integral formation.

Preferably, peg members 134, 234 are dimensioned to be received and retained within apertures 68, 70, respectively, formed on undersides 25, 27, respectively, of cargo box 20; thereby removably securing cargo box 20 to rail assemblies 40, 50.

Accordingly, in use, cargo box 20 may be moved between a stored position, wherein cargo box 20 is situated proximate front wall F of bed B of pickup truck T, and a tailgate position, wherein cargo box 20 is preferably situated proximate tailgate G of bed B of pickup truck T. Preferably, to move cargo box 20 toward tailgate G of pickup truck T, a user actuates backward actuation button 98 of remote unit 96 to transmit a first signal to receiving unit 94 of motor assembly 30, and thus activate motor 32. As such, motor 32 preferably creates a rotational force that is transferred to axle 34 and communicating lower gear 36, chain 80, upper gear 38, and shaft 82 of motor assembly 30. Rotation of shaft 82 preferably rotates front gears 110, 210 of respective rail assemblies 40, 50, which in turn rotate belt chains 120, 220 and rear gears 112, 212 so as to draw securing blocks 130, 230 through slots 104, 204 of respective rail assemblies 40, 50 and, thus, positionally displace cargo box 20 toward tailgate G of pickup truck T.

Preferably, to move cargo box 20 toward front wall F of pickup truck T, a user actuates forward actuation button 97 of remote unit 96 to transmit a second signal to receiving unit 94 of motor assembly 30, wherein the second signal directs receiving unit 94 to activate motor 32 in a reverse direction. As such, motor 32 preferably creates a rotational force that is preferably transferred to axle 34 and communicating lower gear 36, chain 80, upper gear 38, and shaft 82 of motor assembly 30. Reverse rotation of shaft 82 preferably rotates front gears 110, 210 of respective rail assemblies 40, 50, which in turn rotate belt chains 120, 220 and rear gears 112, 212, so as to draw securing blocks 130, 230 back through slots 104, 204 of respective rail assemblies 40, 50 and thus positionally-return cargo box 20 to front wall F of pickup truck T.

Figure 3:
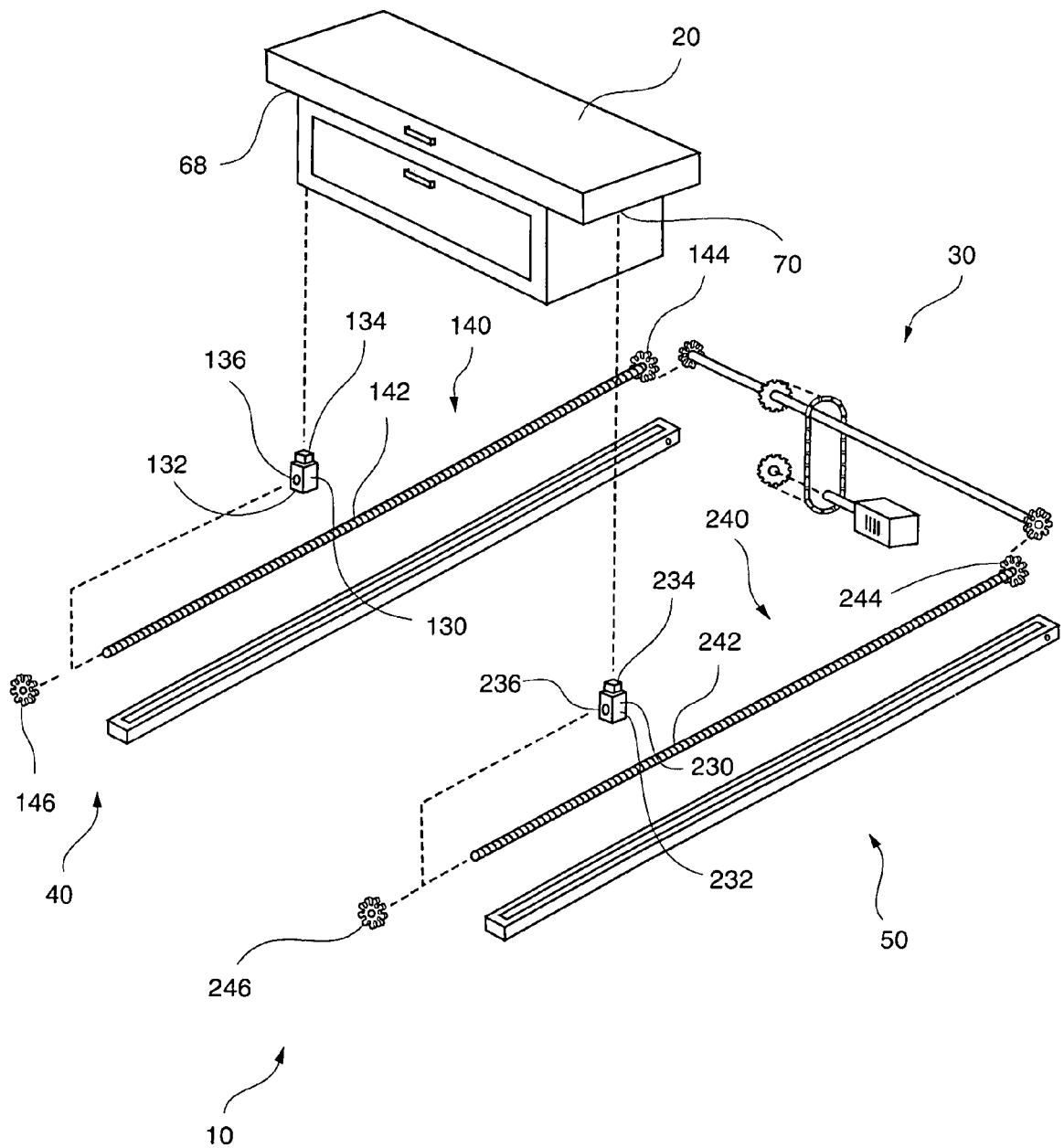
FIG. 3 is an exploded view of a cargo box assembly according to an alternative embodiment of the present invention.

As best illustrated in FIG. 3, in an alternative embodiment of the present invention, belt chains 120, 220 of respective rail assemblies 40, 50 are replaced with screwdrive assemblies 140, 240, respectively. Screwdrive assemblies 140, 240 comprise screwdrive rods 142, 242, respectively, first gears 144, 244, respectively, and second gears 146, 246, respectively. Screwdrive rods 142, 242 comprise threaded outer surfaces, wherein first gear 144 and second gear 146, and first gear 244 and second gear 246, are perpendicularly disposed on opposing terminal ends of respective screwdrive rods 142, 242, perpendicular to the axis of rotation of rods 142, 242. Thus, first gears 144, 244 of screwdrive rods 142, 242, respectively, engage front gears 110, 210, respectively, of rail assemblies 40, 50. Similarly, second gears 146, 246 of screwdrive rods 142, 242, respectively, engage rear gears 112, 212, respectively, of respective rail assemblies 40, 50. Further, securing blocks 130, 230 are coupled to screwdrive rods 142, 242, respectively, wherein securing blocks 130, 230 comprise threaded apertures 136, 236, respectively, through which screwdrive rods 142, 242, respectively, are threadably engaged.

Accordingly, in such an embodiment, rotation of front gears 110, 210 of rail assemblies 40, 50, respectively, drives screwdrive assemblies 140, 240, respectively. More specifically, a rotational force applied to front gears 110, 210 of rail assemblies 40, 50, respectively, is transferred to first gears 144, 244, respectively, screwdrive rods 142, 242, respectively, and second gears 146, 246; thus drawing securing blocks 130, 230 through slots 104, 204 of respective rail assemblies 40, 50 and, thus, positionally displacing cargo box 20 between front wall F and tailgate G of pickup truck T.

It is further contemplated, in another alternative embodiment, that screwdrive assemblies 140, 240 and rail assemblies 40, 50 could lack second gears 146, 246 and rear gears 112, 212, respectively, wherein screwdrive rods 142, 242 could be rotatably mounted within rail assemblies 40, 50, respectively.

In another alternative embodiment, cargo box 20 could comprise dividing partitions, drawers, shelves, trays, bins and/or other like storage accessories.

Figure 4:
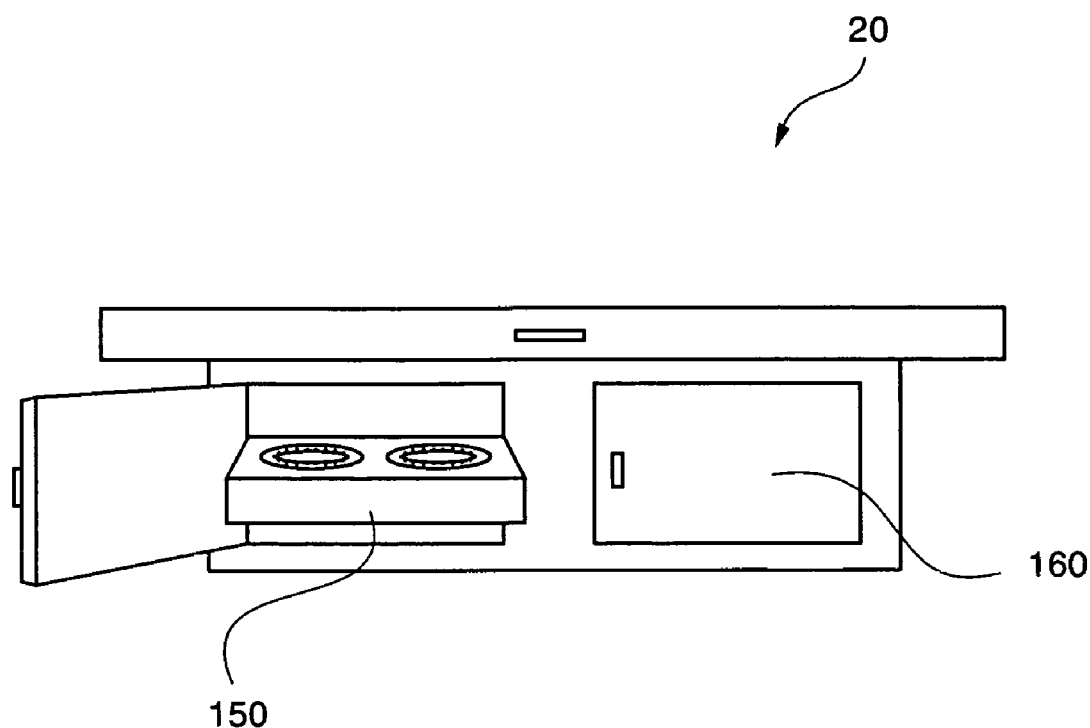
FIG. 4 is a front view of a cargo box of a cargo box assembly according to an alternative embodiment of the present invention.

In still another alternative embodiment, and as best shown with reference to FIG. 4, cargo box 20 could comprise cooking unit 150, wherein cooking unit 150 could comprise, for exemplary purposes only, burners, grills, and/or a toaster oven.

Figure 5:
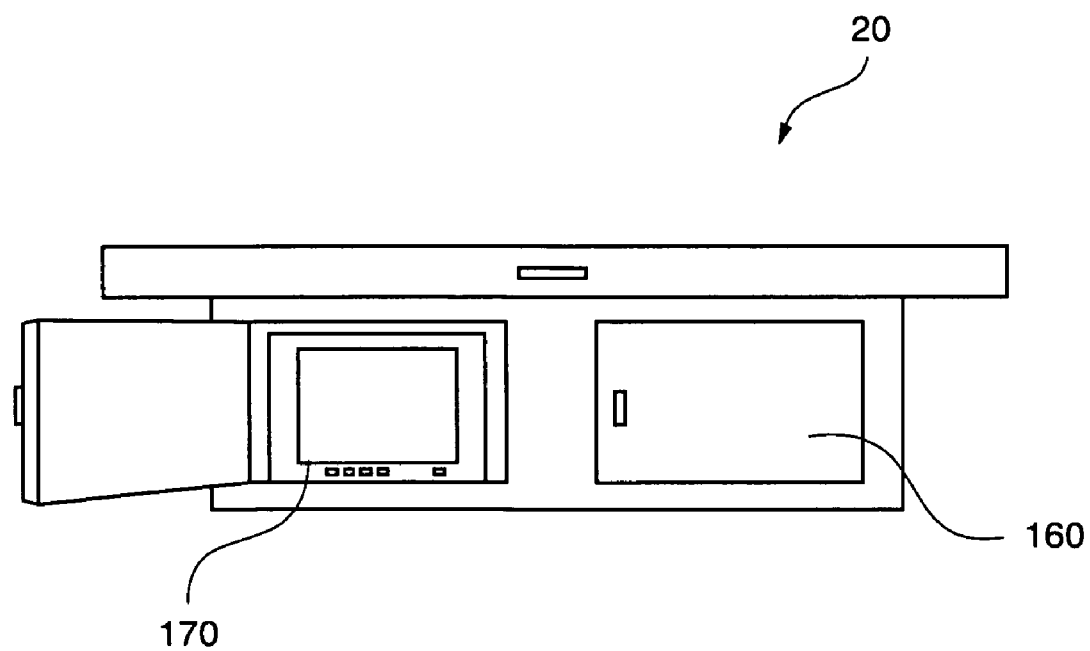
FIG. 5 is a front view of a cargo box of a cargo box assembly according to an alternative embodiment of the present invention.

In yet another alternative embodiment, and as best shown with reference to FIGS. 4–5, cargo box 20 could comprise cooling unit 160, wherein cooling unit 160 could comprise, for exemplary purposes only, a refrigerator, a freezer and/or an insulated cooler.

In still yet another alternative embodiment, and as best shown with reference to FIG. 5, cargo box 20 could comprise entertainment unit 170, wherein entertainment unit 170 could comprise, for exemplary purposes only, a radio, tape player, CD player, DVD player, VHS player, television monitor and/or a video game console.

In a further alternative embodiment, cargo box 20 could be replaced with an animal carrier, wherein the animal carrier could be mounted to securing blocks 130, 230 of rail assemblies 40, 50, respectively.

In still a further alternative embodiment, cargo box 20 could be replaced with passenger seats, wherein the passenger seats could be mounted to securing blocks 130, 230 of rail assemblies 40, 50, respectively.

In yet a further alternative embodiment, two or more boxes 20 could be mounted to rail assemblies 40, 50.

In another alternative embodiment, cargo box assembly 10 could comprise two or more motor assemblies 30.

In still another alternative embodiment, motor assembly 30 could comprise a cover for shielding and protecting its components.

In yet another alternative embodiment, remote unit 96 could be attached to receiving unit 94 of motor assembly 30 via a cord.

In still yet another alternative embodiment, cargo box assembly 10 could lack remote unit 96, wherein receiving unit 94 of motor assembly 30 comprises an actuating switch for activating motor 32.

In a further alternative embodiment, rail assemblies 40, 50 could lack securing blocks 130, 230, respectively, wherein other suitable fastening means could be utilized to attach cargo box 20 to rail assemblies 40, 50, such as, for exemplary purposes only, pegs, pins, dowels, nails, screws, rivets, bolts, brackets, clamps, clasps, hooks, magnets, tab and slot systems, welding and/or integral formation.

In still a further alternative embodiment, rail assemblies 40, 50 could be disposed on the inner surfaces of first sidewall S1 and second sidewall S2, respectively, of bed B of truck T.

In yet a further alternative embodiment, rail assemblies 40, 50 could be disposed on the floor of bed B.

In still yet a further alternative embodiment, front gear 110 and rear gear 112, and front gear 210 and rear gear 212, of rail assemblies 40, 50, respectively, could lack toothed peripheral edges, wherein front gear 110 and rear gear 112, and front gear 210 and rear gear 212, of rail assemblies 40, 50, respectively, could comprise annular grooves on the peripheral edges thereof. In such an alternative embodiment, belt chains 120, 220 could be replaced with looped belts, wherein such looped belts could be securely disposed or received within the annular grooves of front gear 110 and rear gear 112, and front gear 210 and rear gear 212.

In still another alternative embodiment, rail assemblies 40, 50 could extend from bed B of pickup truck T and onto an adjoining ground surface.

In yet another alternative embodiment, rail assemblies 40, 50 could further comprise bristled, rubberized or other flexible lip members to cover slots 104, 204, yet enable securing blocks 130, 230 to effortlessly pass therethrough. In such an embodiment, the lip members inhibit the introduction of debris and moisture into the rail assemblies, thus preventing damage to the components contained therewithin.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A cargo box assembly for a truck bed, said cargo box assembly comprising:

A cargo box; and a motor assembly coupled to a guide assembly to move said cargo box through said guide assembly, wherein said guide assembly further comprises securing blocks and screwdriver rods, and wherein said screwdrive rods are threadably received through apertures in said securing blocks, said securing blocks having base and peg members, and wherein said peg members are disposed atop said base members, and wherein said guide assembly is disposed within housings on a top side of a sidewall of the truck bed, and wherein said cargo box is removably disposed on said peg members, and wherein said peg members are moved by said guide assembly.

2. The cargo box assembly of claim 1, wherein said cargo box comprises a functional unit, wherein said functional unit is selected from the group consisting of a storage member, a cooking unit, a cooling unit, an entertainment unit and combinations thereof.

3. The cargo box assembly of claim 1, further comprising a wireless remote control unit to control the operation of said motor assembly.

4. The cargo box assembly of claim 1, wherein said guide assembly is mounted to at least a portion of the truck bed, said at least a portion selected from the group consisting of sidewalls, top edges of the sidewalls and truck bed floors, and wherein said guide assembly comprises slots therein, and wherein said securing blocks pass through said slots.

5. The cargo box assembly of claim 1, wherein said cargo box is operatively mounted to said guide assembly, and wherein said guide assembly comprises a gear-and-chain mechanism to move said cargo box along said guide assembly.

6. The cargo box assembly of claim 1, wherein said cargo box is operatively mounted to said guide assembly, and wherein said guide assembly comprises a screwdrive mechanism to move said cargo box along said guide assembly.

7. A cargo box assembly for a truck bed, said cargo box assembly comprising:

a motorized means for moving a cargo box within a vehicle; and screwdrive mechanisms disposed within housings on a sidewall of the truck bed, wherein said cargo box is removably disposed on securing blocks, and wherein said securing blocks are moved by said screwdrive mechanisms, and wherein said screwdrive mechanisms comprise screwdrive rods and said securing blocks, and wherein said securing blocks each comprise a base and a peg member disposed on said base, and wherein each of said screwdrive rods is threadably received through an aperture in each of said respective securing blocks, and wherein said cargo box is removably secured to said peg members.

8. The cargo box assembly of claim 7, wherein said cargo box comprises a functional unit, wherein said functional unit is selected from the group consisting of a storage member, a cooking unit, a cooling unit and an entertainment unit.

9. The cargo box assembly of claim 7, further comprising a wireless remote control unit to control the operation of said motorized means.

10. The cargo box assembly of claim 7, wherein said cargo box is operatively mounted to a guide assembly.

11. The cargo box assembly of claim 10, wherein said housings are mounted to at least a portion of the truck bed, said at least a portion selected from the group consisting of sidewalls, top edges of the sidewalls and truck bed floors.

12. The cargo box assembly of claim 10, wherein said guide assembly comprises a gear-and-chain mechanism to move said cargo box along said guide assembly.

13. The cargo box assembly of claim 12, wherein said gear-and-chain mechanism comprises a first gear, and a chain, wherein said chain is linked to said cargo box.

14. The cargo box assembly of claim 10, wherein said screwdrive mechanism moves said cargo box along said guide assembly.

15. The cargo box assembly of claim 7, wherein rotation of said screwdrive rods move said securing blocks.

16. A method of moving a cargo box from a forward area of a vehicle truck bed to a rear area of the vehicle truck bed, comprising the step of:

utilizing a motorized force to move said cargo box through a guide assembly, wherein said guide assembly comprises at least one screwdrive mechanism within at least one housing, and wherein said at least one housing is disposed on a top side of a sidewall of the truck bed, and wherein said cargo box is removably disposed on securing blocks having base and peg members, and wherein said at least one screwdrive mechanism comprises a screwdrive rod threadably received through an aperture in said securing blocks, and wherein said securing blocks are moved by said guide assembly.

17. The method of claim 16, further comprising the step of applying said motorized force to a chain-and-gear mechanism within said guide assembly.

18. The method of claim 17, further comprising the step of transferring said motorized force from said chain-and-gear mechanism of said guide assembly to said cargo box.

19. The method of claim 18, further comprising the step of applying a reverse motorized force to said chain-and-gear mechanism of said guide assembly, wherein said reverse motorized force is transferred to said cargo box to move said cargo box in a reverse direction.

20. The method of claim 16, further comprising the step of applying said motorized force to said at least one screwdrive mechanism within said guide assembly.

21. The method of claim 20, further comprising the step of transferring said motorized force from said at least one screwdrive mechanism of said guide assembly to said cargo box.

22. The method of claim 21, further comprising the step of applying a reverse motorized force to said at least one screwdrive mechanism of said guide assembly, wherein said reverse motorized force is transferred to said cargo box to move said cargo box in a reverse direction.

* * * * *